US012706011B2

(12) United States Patent
Chappalli et al.

(10) Patent No.: US 12,706,011 B2
(45) Date of Patent: Aug. 11, 2026

(54) DYNAMIC ARBITRARY BORDER GAIN

(71) Applicant: Apple Inc., Cupertino, CA (US)

(72) Inventors: Mahesh B Chappalli, San Jose, CA (US); Arthur L Spence, San Jose, CA (US); Bartosz Ciechanowski, Cupertino, CA (US); Ross Thompson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 18/453,186

(22) Filed: Aug. 21, 2023

(65) Prior Publication Data

US 2024/0078949 A1 Mar. 7, 2024

Related U.S. Application Data

(60) Provisional application No. 63/404,091, filed on Sep. 6, 2022.

(51) Int. Cl.
*G09G 5/10* (2006.01)
*G09G 3/20* (2006.01)

(52) U.S. Cl.
CPC ....... *G09G 3/20* (2013.01); *G09G 2320/0266* (2013.01); *G09G 2320/029* (2013.01)

(58) Field of Classification Search
CPC ............. G09G 3/20; G09G 2320/0266; G09G 2320/029; G09G 3/2011; G09G 2320/0613; G09G 5/10; G09G 2310/0232; G09G 2320/0686; G09G 2320/103
See application file for complete search history.

(56) References Cited

U.S. PATENT DOCUMENTS

| | | | | |
|---|---|---|---|---|
| 6,266,069 | B1 | 7/2001 | Thagard et al. | |
| 8,768,069 | B2 | 7/2014 | Springer et al. | |
| 10,068,548 | B1 | 9/2018 | Chou et al. | |
| 10,714,049 | B2 | 7/2020 | Cho et al. | |
| 2004/0201608 | A1* | 10/2004 | Ma ..................... | H04N 21/4263 715/719 |
| 2004/0252759 | A1 | 12/2004 | Winder et al. | |

(Continued)

FOREIGN PATENT DOCUMENTS

| | | | |
|---|---|---|---|
| CN | 101987023 | B | 5/2014 |
| CN | 111292383 | A | 9/2022 |

(Continued)

OTHER PUBLICATIONS

International Search Report & Written Opinion for PCT Application No. PCT/US2023/032028 dated Jan. 4, 2024; 12 pgs.

*Primary Examiner* — Kent W Chang
*Assistant Examiner* — Karl Duc Truong
(74) *Attorney, Agent, or Firm* — Fletcher Yoder, PC

(57) ABSTRACT

An electronic device may include a display panel and processing circuitry. The display panel may display frames of image data having a static border that remains the same across multiple frames and a dynamic border that changes between a first frame and a second frame. The processing circuitry may apply a static gain value set from a static gain map to pixels to reduce or eliminate aliasing image artifacts along the static border. The processing circuitry may also apply a changing gain value set from a dynamic gain map to pixels to reduce or eliminate aliasing image artifacts along the dynamic border.

20 Claims, 9 Drawing Sheets

(56) References Cited

U.S. PATENT DOCUMENTS

| | | | | |
|---|---|---|---|---|
| 2011/0090370 | A1* | 4/2011 | Cote | H04N 25/68 348/241 |
| 2011/0134316 | A1 | 6/2011 | Oguchi et al. | |
| 2015/0281608 | A1 | 10/2015 | Miyahara | |
| 2015/0365306 | A1* | 12/2015 | Chaudhri | H04N 21/47205 715/753 |
| 2017/0004861 | A1* | 1/2017 | Wolfkill | H04N 21/4722 |
| 2017/0061843 | A1* | 3/2017 | Zhao | G09G 5/10 |
| 2017/0372675 | A1* | 12/2017 | Cho | G09G 5/005 |
| 2018/0005387 | A1* | 1/2018 | Lee | H04N 19/182 |
| 2018/0144507 | A1 | 5/2018 | Leblanc et al. | |
| 2018/0275863 | A1* | 9/2018 | Li | G06F 3/04845 |
| 2018/0357979 | A1* | 12/2018 | Nakamura | G09G 3/2003 |
| 2019/0156469 | A1* | 5/2019 | Choi | G06T 3/403 |
| 2019/0221177 | A1* | 7/2019 | Jin | G09G 3/3607 |
| 2020/0105208 | A1 | 4/2020 | Kempf | |
| 2020/0336715 | A1* | 10/2020 | Hu | H04N 9/3188 |

FOREIGN PATENT DOCUMENTS

| | | | |
|---|---|---|---|
| EP | 3893234 | A1 | 10/2021 |
| WO | 2022100663 | A1 | 5/2022 |

* cited by examiner

DYNAMIC ARBITRARY BORDER GAIN

CROSS-REFERENCE TO RELATED APPLICATIONS

This application claims priority to U.S. Provisional Application No. 63/404,091, filed Sep. 6, 2022, entitled "DYNAMIC ARBITRARY BORDER GAIN," the disclosure of which is incorporated by reference in its entirety for all purposes.

BACKGROUND

The present disclosure relates generally to display systems and devices and, more specifically, to displaying images having dynamic display areas with arbitrary borders.

Electronic devices often use electronic displays to provide visual representations of information by displaying one or more images. Such electronic devices may include computers, mobile phones, portable media devices, tablets, televisions, virtual-reality headsets, vehicle dashboards, and so forth. To display an image, an electronic display may control light emission from display pixels based on image data, which indicates target characteristics of the image. For example, the image data may indicate target luminance of specific color components, such as a green, a blue, and/or a red component, at various pixels in the image.

The electronic display may enable perception of various colors in the image by blending (e.g., averaging) the color components. For example, blending the green component, the blue component, and the red components at various luminance levels may enable perception of a range of colors from black to white. To facilitate controlling luminance of the color components, each display pixel in the electronic display may include one or more sub-pixels, which each controls luminance of one color component. For example, a display pixel may include a red sub-pixel, a blue sub-pixel, and/or a green sub-pixel. To enhance image quality around the edges of an electronic display—particularly along rounded edges of an electronic display—image processing circuitry may apply a gain value set (e.g., a gain value to be applied to each sub-pixel color type) for each pixel in a particular display region of a frame of the image data so that the pixels illuminate and facilitate displaying the image as desired. The gain value set may prevent or reduce aliasing along the rounded border. Often, the gain value set may be predetermined or known a priori. For example, the gain value set may be determined during manufacturing of the display with the rounded border display region. As such, the gain value set may be static.

SUMMARY

To display images with dynamic display areas having arbitrary borders that differ from image frame to image frame, image processing circuitry may apply a dynamic gain value set to prevent or reduce aliasing along the arbitrary borders of the dynamic display area. Indeed, there may be many use cases where images may have elements with arbitrary borders in relation to other elements. By way of example, some user interface elements may expand, shrink, separate, or move dynamically over a series of image frames. To ensure that the borders of these elements appear crisp and clean, a dynamic gain value set may be applied to regions of image data that include the borders. The dynamic gain value set may be associated with a dynamic gain value map that may change from image frame to image frame based on the position of the borders of the dynamic display.

In some cases, the dynamic gain value set of the dynamic gain map may be applied in addition to or independent of a static gain value set associated with a static gain map for static arbitrary borders (e.g., fixed borders of an electronic display). These may also be referred to as a primary gain map (e.g., static gain map) and secondary gain map (e.g., dynamic gain map) of gain value sets that are applied for arbitrary border gain (ABG) correction to pixels displaying image data in various display regions. The ABG correction may prevent or reduce image artifacts along a border of an arbitrary shape (e.g., a rounded border, an angled border), such that the gain values applied to the respective pixels provide an anti-aliasing effect along the border. For example, a group of pixels may form a display region displaying at least some image data. In some cases, the display region may encompass a portion of the display with non-rectilinear borders (e.g., may have rounded edges).

The primary gain map (e.g., static gain map) may include gain value sets of gain values to apply to the pixels (e.g., sub-pixels of the pixels) where borders in the image data do not change between frames of image data. By way of example, the primary gain map (e.g., static gain map) may provide a gain value set to adjust the borders of the electronic display. The secondary gain map (e.g., a dynamic gain map) may include gain value sets of gain values to apply to the pixels of changing display regions, where the borders change between frames of image data. The changes may include width and/or height of the display region, the presence of the display region (e.g., present on subsequent frame and not on previous frame), the position of the display region on the display (e.g., along an x-axis direction and/or a y-axis direction), and the like. The gain value sets of the secondary gain map may be dynamic and change with each frame of image data, for example, based on the changes to the dynamic display regions. As will be discussed in detail herein, the systems and methods described herein may facilitate in providing crisp edges along the rounded borders of the display regions. In other cases, there may be a single gain map that includes both the static gain value set and dynamic gain value sets. Additionally or alternatively, there may be multiple different dynamic gain maps with gain value sets corresponding to different image elements with different dynamic borders.

DETAILED DESCRIPTION OF SPECIFIC EMBODIMENTS

Figure 1:
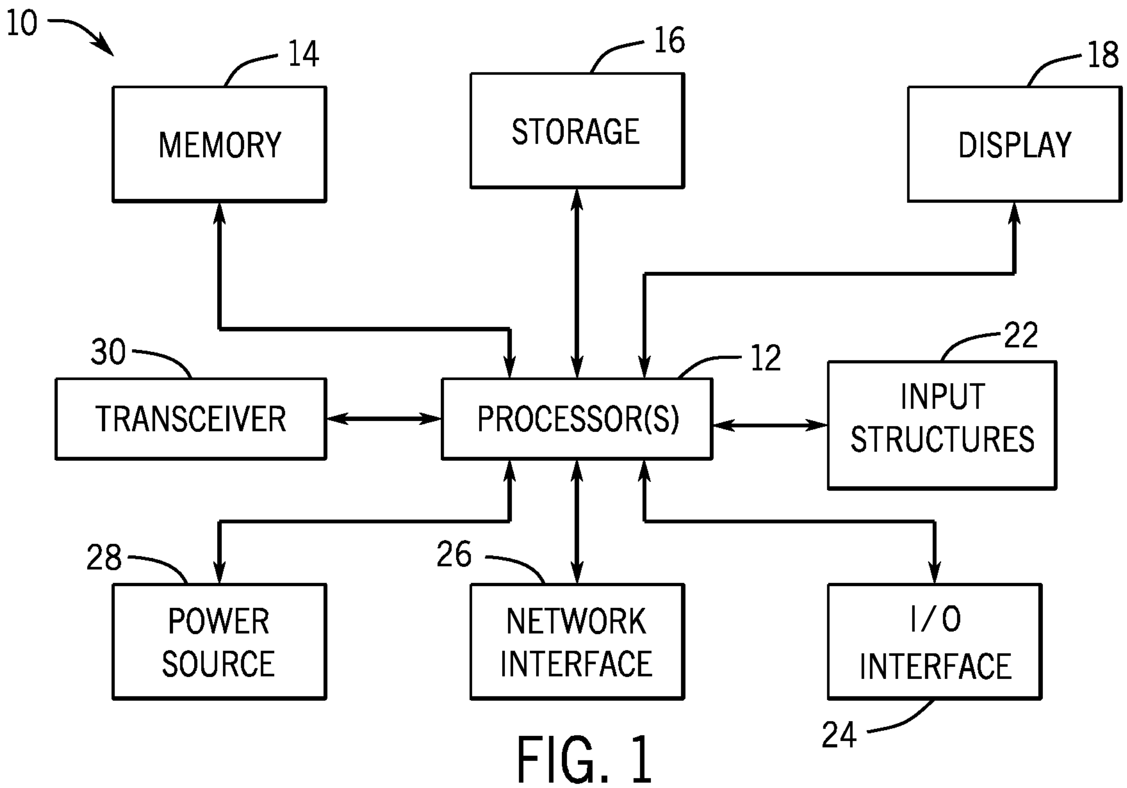
FIG. 1 is a block diagram of an electronic device, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). As used herein, an "active region" refers to a portion of a frame of image data that undergoes processing. As such, when applying an arbitrary border gain (ABG) to a frame of image data, the portion of the frame that utilizes the arbitrary border gain technique may be the active region. As will be discussed herein, a display region may be included in the active region. The ABG techniques applied to the active region may facilitate displaying image data in the display region without fringing or other image artifacts along borders of elements of the display region.

As previously mentioned, electronic devices may include displays, which present visual representations of information, for example, as images in one or more image frames. To display an image, an electronic display may control light emission from its display pixels based on image data, which indicates target characteristics of the image. For example, the image data may indicate target luminance (e.g., brightness) of specific color components in a portion (e.g., image pixel) of the image, which when integrated by the human eye may result in perception of a range of different colors. Generally, each display pixel in the electronic display may correspond with an image pixel in an image to be displayed. In other words, a display pixel and an image pixel may correspond to a pixel position. To facilitate displaying the image, a display pixel may include one or more sub-pixels, which each controls luminance of one color component at the pixel position. For example, the display pixel may include a red sub-pixel that controls luminance of a red component, a green sub-pixel that control luminance of a green component, and/or a blue sub-pixel that controls luminance of a blue component.

Moreover, in some instances, display regions that include the sub-pixels may vary in one or more characteristics, such as shape and/or size. For example, a first display region may have an element with four straight borders connected at approximately ninety-degree corners. On the other hand, a second display region may have elements with non-rectilinear borders. For example, the second display region may have four straight borders connected with four rounded (e.g., curved) borders. As previously mentioned, a gain map may include gain value sets for sub-pixels of pixels of image data. By way of example, arbitrary border gain correction may involve gain value sets that are applied at the sub-pixels to reduce or eliminate image artifacts that may otherwise result at the borders of the various shaped display regions.

To compensate for static borders of arbitrary shape, a gain map may be static, such that the same gain value sets applied at the active region are applied at the respective sub-pixels. By way of example, the static gain map may include gain values to resolve for image artifacts otherwise occurring at a known or predetermined non-rectilinear border of the display. However, the display may include multiple display regions and the display regions may vary between the frames of image data, such that a static gain value set may not resolve for image artifacts at the borders of the varying display regions. Accordingly, the present disclosure provides techniques for improving perceived image quality of an electronic display, for example, by processing image data using dynamic gain value sets based on dynamic display regions for frames of image data.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and a transceiver 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
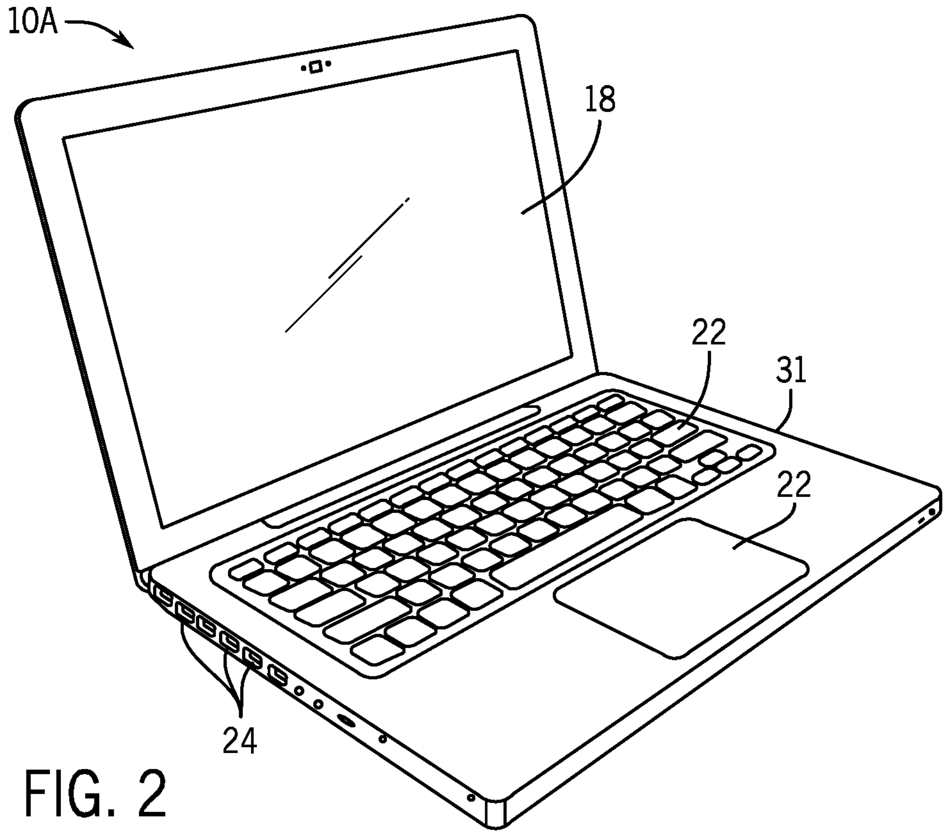
FIG. 2 is a perspective view of a notebook computer representing an embodiment of the electronic device of FIG. 1.
Figure 4:
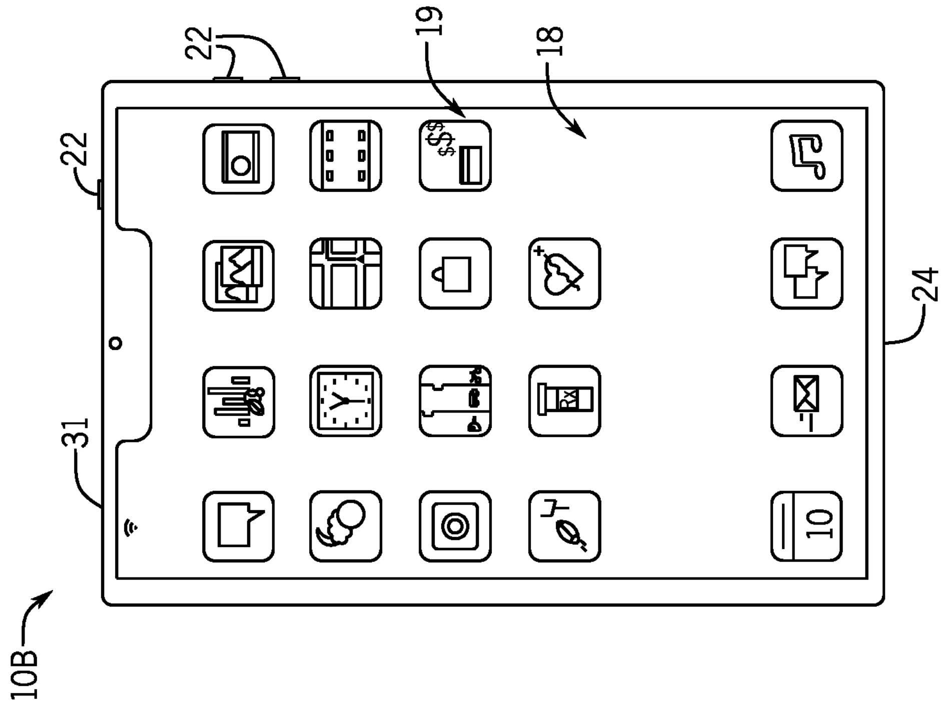
FIG. 4 is a front view of another handheld device representing another embodiment of the electronic device of FIG. 1.
Figure 3:
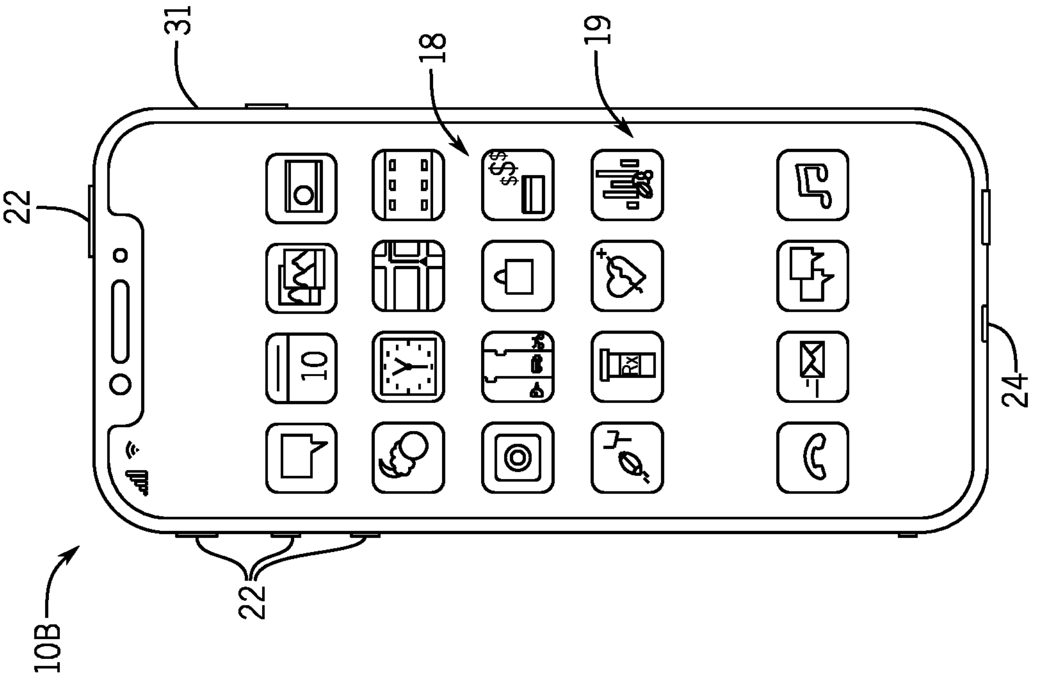
FIG. 3 is a front view of a handheld device representing another embodiment of the electronic device of FIG. 1.
Figure 5:
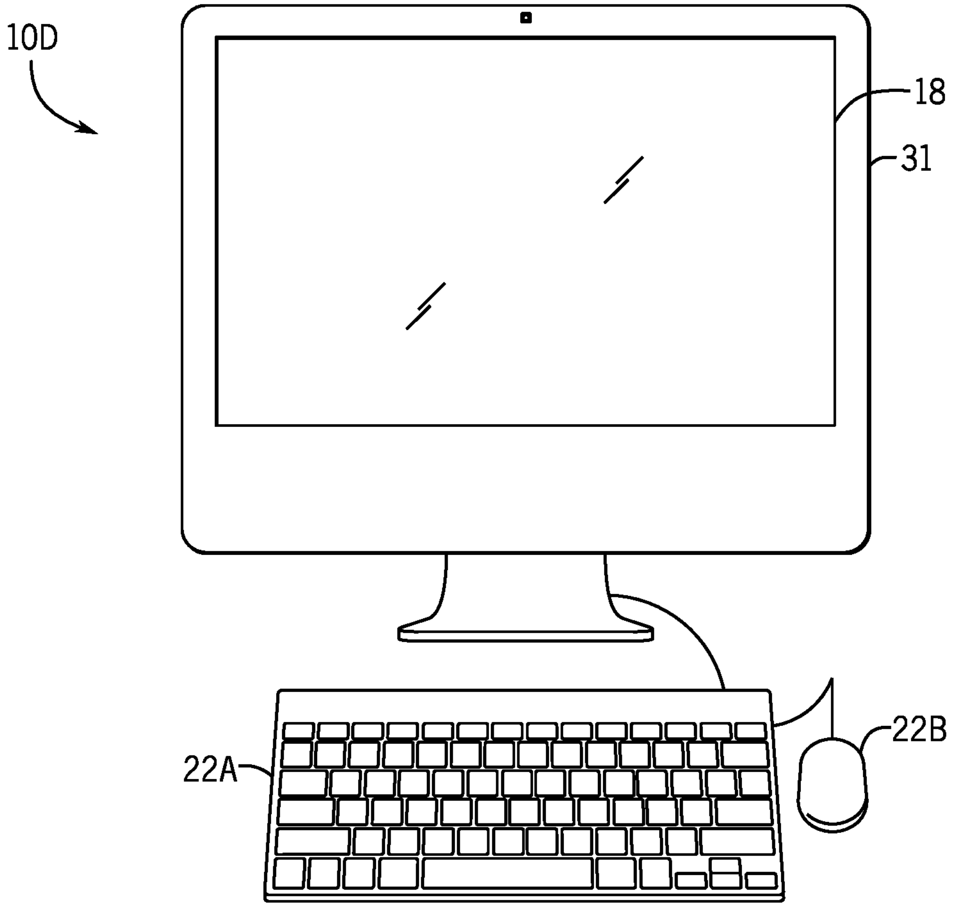
FIG. 5 is a front view of a desktop computer representing another embodiment of the electronic device of FIG. 1.
Figure 6:
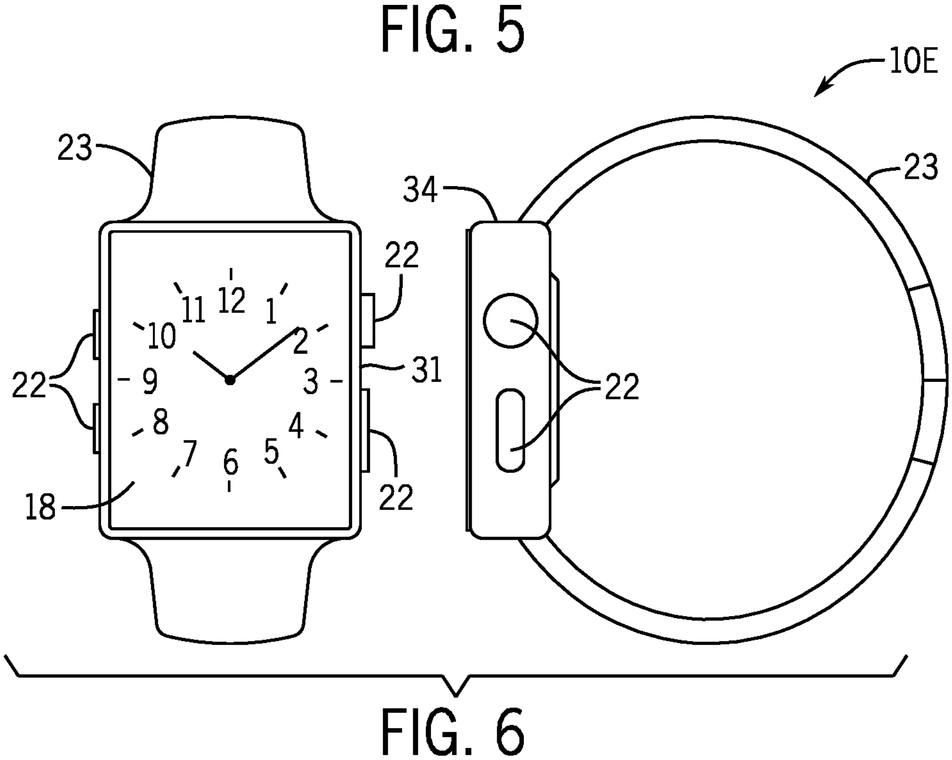
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms or instructions. For example, algorithms for implementing the static and/or dynamic gain map may be saved in the memory 14 and/or nonvolatile storage 16. Such algorithms or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the algorithms or instructions. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may display images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies. The displays may include display regions that are dynamic or static between displaying frames of image data.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FED network, and/or for a wide area network (WAN), such as a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network. In some embodiments, the electronic device 10 may communicate over the aforementioned wireless networks (e.g., WI-FI®, WIMAX®, mobile WIMAX®, 4G, LTE®, 5G, and so forth) using the transceiver 30. The transceiver 30 may include circuitry useful in both wirelessly receiving the reception signals at the receiver and wirelessly transmitting the transmission signals from the transmitter (e.g., data signals, wireless data signals, wireless carrier signals, radio frequency signals). As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The depicted notebook computer 10A may include a housing or enclosure 31, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or an application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, California. The handheld device 10B may include an enclosure 31 to protect interior components from physical damage and/or to shield them from electromagnetic interference. The enclosure 31 may surround the display 18, which displays an array of icons 19. By way of example, when an icon 19 is selected either by an input structure 22 or a touch sensing component of the electronic display 18, an application program may launch. The I/O interfaces 24 may open through the enclosure 31 and may include, for example, an I/O port for a hardwired connection for charging and/or content manipulation using a standard connector and protocol, such as the Lightning connector provided by Apple Inc. of Cupertino, California, a universal serial bus (USB), or other similar connector and protocol. The I/O interfaces 24 may be associated with wiring and connectors within the radio frequency packaging of the electronic device 10.

The input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer 10D may also represent a personal computer (PC) by another manufacturer. A similar enclosure 31 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 23, may be an Apple Watch® by Apple Inc. of Cupertino, California. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
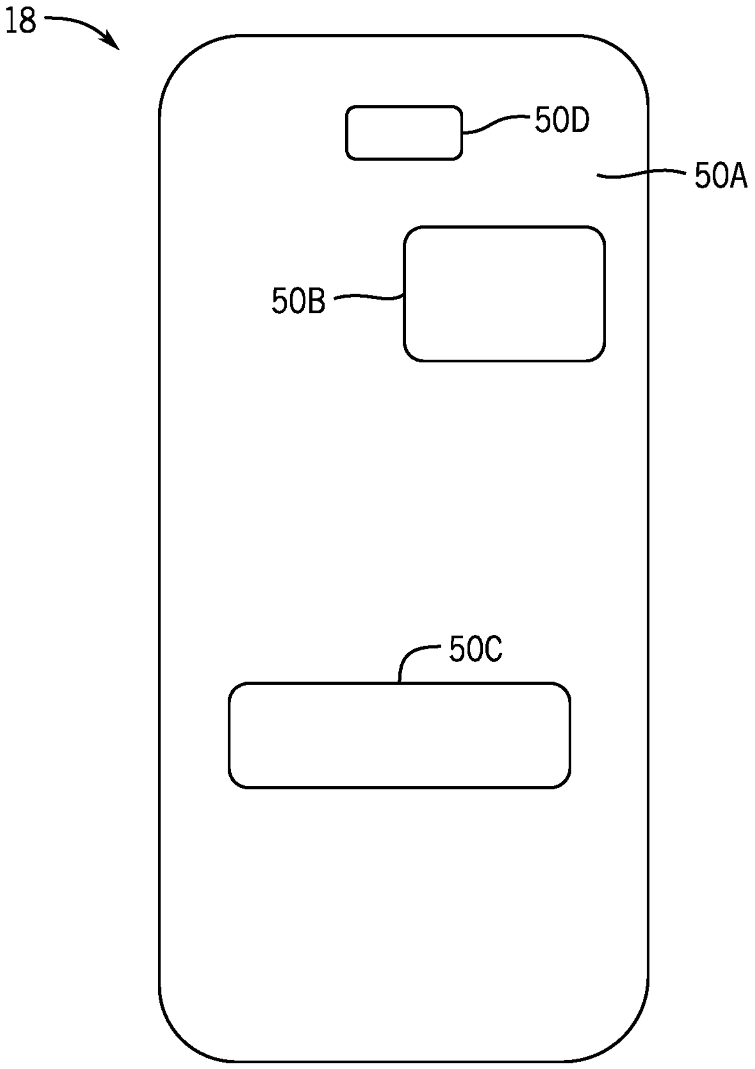
FIG. 7 is a diagrammatic representation of static and/or dynamic display regions on a display of the electronic device of FIG. 1, according to embodiments of the present disclosure.

With the foregoing in mind, FIG. 7 is a diagrammatic representation of display regions 50 (e.g., active regions) on a display 18 of the electronic device of FIG. 1. Although the depicted embodiment shows four display regions 50, which represents a particular embodiment, the techniques described herein may apply to one or more display regions 50 in one or more frames. In the depicted embodiment, the display 18 includes a first display region 50A, a second display region 50B, a third display region 50C, and a fourth display region 50D displayed during a single frame. Generally, the display regions 50 may include areas or elements with rounded borders and/or non-rectilinear areas that may benefit from arbitrary border gain to reduce image artifacts along their edges. Here, the display regions 50 have rounded borders.

As previously discussed, gain value sets may be applied to pixels along the rounded borders of the display regions 50. That is, active regions may include the display regions 50 for applying arbitrary border gain. As previously mentioned, an active region includes a portion of a frame of image data that undergoes processing, effectively a frame boundary. By way of example, processing may include applying gain value sets to a pixel for arbitrary border gain correction. Data applied to a pixel located outside the active region may be copied from the input to the output (e.g., additional gain not applied prior to driving the pixels). Generally, the display regions 50 may include dimensions corresponding to approximately the size of the display 18 or portions of the display 18. In some instances, such as for rounded borders, the arbitrary border gain of an active region may generally include a gain to be applied to a portion of the display and this portion may be greater than another portion with the rounded border of the display region 50. For example, an x-y definition of the active region in an x-y coordinate system may be rectangular to encompass the rounded border of the display region 50 to apply the arbitrary border mask around the rounded borders.

Specifically, an image data source may generate image data corresponding to a rectangular image. A display pipeline could adjust the rectangular image frame of image data for display on the non-rectilinear display region 50, for example, by applying a black mask at pixels outside the display region 50. However, in some instances, applying a black mask may result in perceivable visual artifacts, such as color fringing along the border of the display region 50 and/or aliasing along the rounded border of the display region 50.

As such, gain value sets (e.g., for an arbitrary gain) of a gain map may be applied to the pixels of one or more display regions 50 along the rounded border for arbitrary border gain correction. Generally, and as previously mentioned, the active region includes a portion of a frame of image data that undergoes processing. The pixels located outside of the active region may output image data that is the same or approximately the same as input image data, such that the image data has not gone through processing related to the arbitrary border gain correction.

As will be discussed herein, and in some embodiments, two independently coded maps, such as a primary gain map (e.g., static gain map) and/or a secondary gain map (e.g., dynamic gain map), may provide the gain value sets for a frame. The primary gain map may take any suitable shape in relation to the electronic display 18. For example, when the electronic display 18 includes rounded edges, the primary gain map may include edge gains along the border of the display region 50A and/or along the border of the display 18, where the edge gains are statically configured and may be applied to the entire display region 50A. Thus, the gain value sets applied to respective pixels for the primary gain map are static for each pixel between frames of image data. On the other hand, the secondary gain map may include gain value sets that change between frames of image data to correct for dynamic borders. The gain value sets of the secondary gain map are dynamically configured and/or reconfigured on a per-frame basis, generally enabled or disabled (e.g., such that the display region 50 may appear or disappear between frames), and/or the position and/or the size of the map may change (e.g., corresponding to changing display regions 50 between frames).

By applying such gain values of the gain value sets, the pixels adjacent the rounded border of a display region 50 may be dimmed or otherwise adjusted (e.g., changed in luminance) to reduce likelihood of producing perceivable aliasing along the rounded border when the image is displayed. In additional or alternative embodiments, the display regions 50 may include rectangular borders. As will be discussed herein, in addition to gain values derived from the gain maps, separate fixed gain values along the rectangular edges of a display region 50 for the primary map and the rectangular edges of the secondary map may be specified through sets of registers with gains that are independent for each sub-pixel color and/or per rectangular edge of the display region 50.

In the depicted embodiment, the first display region 50A may include the largest portion of the display 18, but the first display region 50A may take any other suitable shape. Indeed, the first display region 50A may occupy only part of the electronic display and may not overlap with other display regions 50 (e.g., those associated with dynamic gain maps) in other examples. By way of example, the first display region 50A may have static borders that are fixed (e.g., based on the physical edges of the electronic display 18) and do not change from frame to frame. The other display regions 50 (e.g., 50B, 50C, 50D) may encompass different areas of the display 18 than the first display region 50A that may or may not overlap with the display region 50A. By way of example, these other display regions 50 (e.g., 50B, 50C, 50D) may have dynamic borders that change from frame to frame. As such, these changing display regions 50 (e.g., 50B, 50C, 50D) may be referred to as dynamic display regions 50 that may change in size, width, length, position, and so forth. The dynamic display regions 50 may, additionally or alternatively, appear or disappear from one frame to another (e.g., the presence of different display regions 50 may vary depending on the frame). Moreover, the dynamic borders of the dynamic display regions 50 may have shapes that change from frame to frame.

By way of example, animation that may call for precise arbitrary borders within the electronic display 18 may use a dynamic display region 50 that may have borders that grow or shrink. By using a dynamic display region 50 to apply a border gain to the changing borders in the animation, the borders may be precise and clean, avoiding image artifacts (e.g., color fringing) that might otherwise appear.

As will be discussed in more detail with respect to FIG. 8, and by way of example, the primary gain map may include gain value sets to be applied to pixels of the first display region 50A (e.g., the borders of the first display region 50A). On the other hand, the secondary gain map (e.g., a dynamic gain map) may include gain value sets of gain values to apply to the pixels of the dynamic display regions 50 (e.g., 50B, 50C, 50D). Since the borders of these dynamic display regions 50 (e.g., 50B, 50C, 50D) may change from frame to frame, the secondary gain map(s) may include gain value sets for one or more dynamic display regions 50 (e.g., 50B, 50C, 50D) that change from frame to frame accordingly. This may allow animations with precise borders having an arbitrary shape (e.g., rounded, curved, jagged, straight) to appear on the display 18. Indeed, the gain value sets of the secondary gain map may be dynamic and change with each frame of image data, for example, based on the changes to the dynamic display regions 50B-50D. The systems and methods described herein may facilitate providing crisp edges along arbitrary (e.g., rounded, curved, jagged, straight) borders in the display regions 50. Indeed, in some cases, one or more dynamic display regions 50 may appear along an edge of the display and may facilitate crisp animation near or together with edges of the display, as well.

Figure 8:
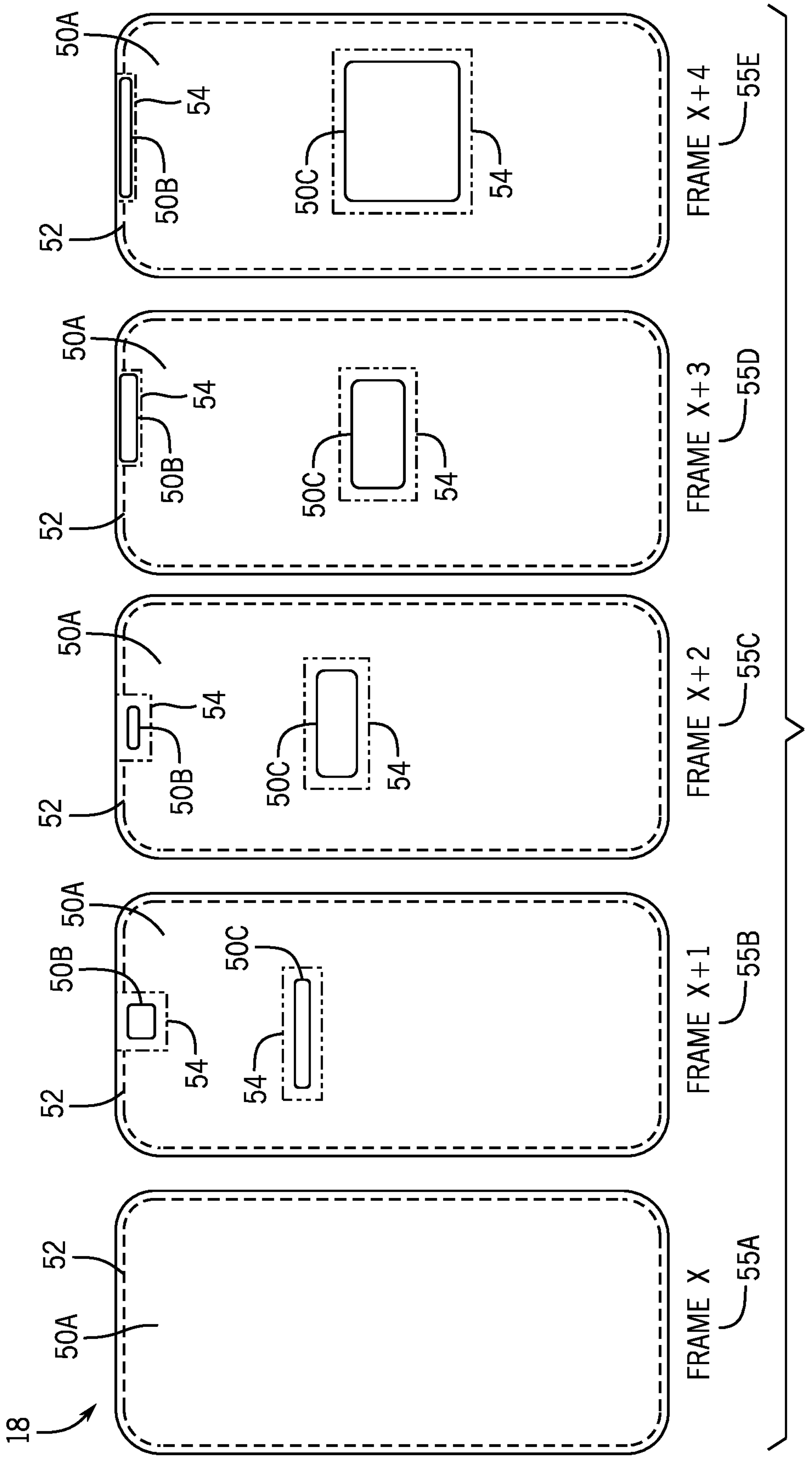
FIG. 8 is a diagrammatic representation of a primary gain map and/or a secondary gain map applied to the display regions, according to embodiments of the present disclosure.

To illustrate, FIG. 8 is a diagrammatic representation of a primary gain map 52 and/or a secondary gain map 54 applied to various display regions 50 of an electronic device 10. Although the current embodiment shows the display 18 for five frames 55 of image data, which represents a particular embodiment, the system and methods described herein may include a primary gain map 52 and/or a secondary gain map 54 for applying arbitrary gains along the borders of or within one or more display regions 50 in one or more frames 55. While the representation of FIG. 8 illustrates image data for display on a handheld device, the image data may be formatted for any other suitable displays (e.g., round displays, arbitrarily shaped displays).

As shown, a first frame 55A (Frame X) includes the first display region 50A. As previously mentioned, the first display region 50A may include image data that does not change between frames and as such, application of the primary gain map 52 (indicated by the dashed line box) may provide the gain values to be applied to pixels in the first display region 50A. The primary gain map 52 may take any suitable shape (e.g., may be rectilinear, may be rectangular, may take an arbitrary shape), and may encompass all or part of the image frame to fully enclose the static borders of the electronic display. On the other hand, a second frame 55B (Frame X+1), a third frame 55C (Frame X+2), a fourth frame 55C (Frame X+3), and a fifth frame 55E (Frame X+4) include changing display regions 50, such as the second display region 50B and the third display region 50C, between the successive frames 55. These frames 55B-E also include a portion of the display 18 with image data that remains the same or substantially the same between the successive frames. As such, frames 55B-E also include the first display region 50A in addition to the changing display regions 50B, 50C. The second display region 50B and the third display region 50C change between the frames 55 and, as such, are dynamic. Thus, application of the secondary gain map 54 (indicated by the dotted line box) may provide the gain values to be applied to pixels along the borders of these dynamic display regions 50B, 50C. The secondary gain map 54 may be smaller than or the same size as the primary gain map 52. In some cases, there may be multiple secondary gain maps 54 for different dynamic display regions 50 (e.g., one for 50B, one for 50C, one for 50D; one for 50B and 50C, one for 50D).

As shown, the second display region 50B disposed at the top portion of the display 18 in the second frame 55B through the fifth frame 55E may include a region having rounded edges and is a region that changes by becoming more rectangular as the frames progress. Moreover, the second display region 50B appears on the second frame 55B. For example, the second display region 50B first appears on the second frame 55B and then increases in width (e.g., along an x-axis in an x-y coordinate system) and/or decreases in height (e.g., along a y-axis in the x-y coordinate system) between the second frame 55B through the fifth frame 55E, as the frames 55 progress. Similarly, the third display region 50C first appears on the second frame 55B and increases in height along the y-axis, as well as moves along the display 18 to become more centered on the display 18. As such, the secondary gain map 54 may apply to the dynamic display regions 50B, 50C that have varying display region characteristics as the frames 55 progress, where the characteristics include size (e.g., width and/or height of the display region 50), presence of the display region 50 (e.g., present on subsequent frame and not on previous frame), position of the display region 50 on the display 18 (e.g., moving in a negative x-axis direction and/or a positive y-axis direction), and the like. The secondary gain map 54 may update with each frame 55 based at least in part on the changes to the dynamic display regions 50B, 50C. That is, the gain value sets of the secondary gain map 54 may update for each frame 55 to continue providing smooth edges at the borders of the dynamic display regions 50B, 50C. The gain value sets of the secondary gain map 54 may be programmed by processing circuitry of the electronic device (e.g., GPU, display pipeline, an application processor, metadata of a frame of image data) at any suitable rate (e.g., on a frame-by-frame basis).

Figure 9:
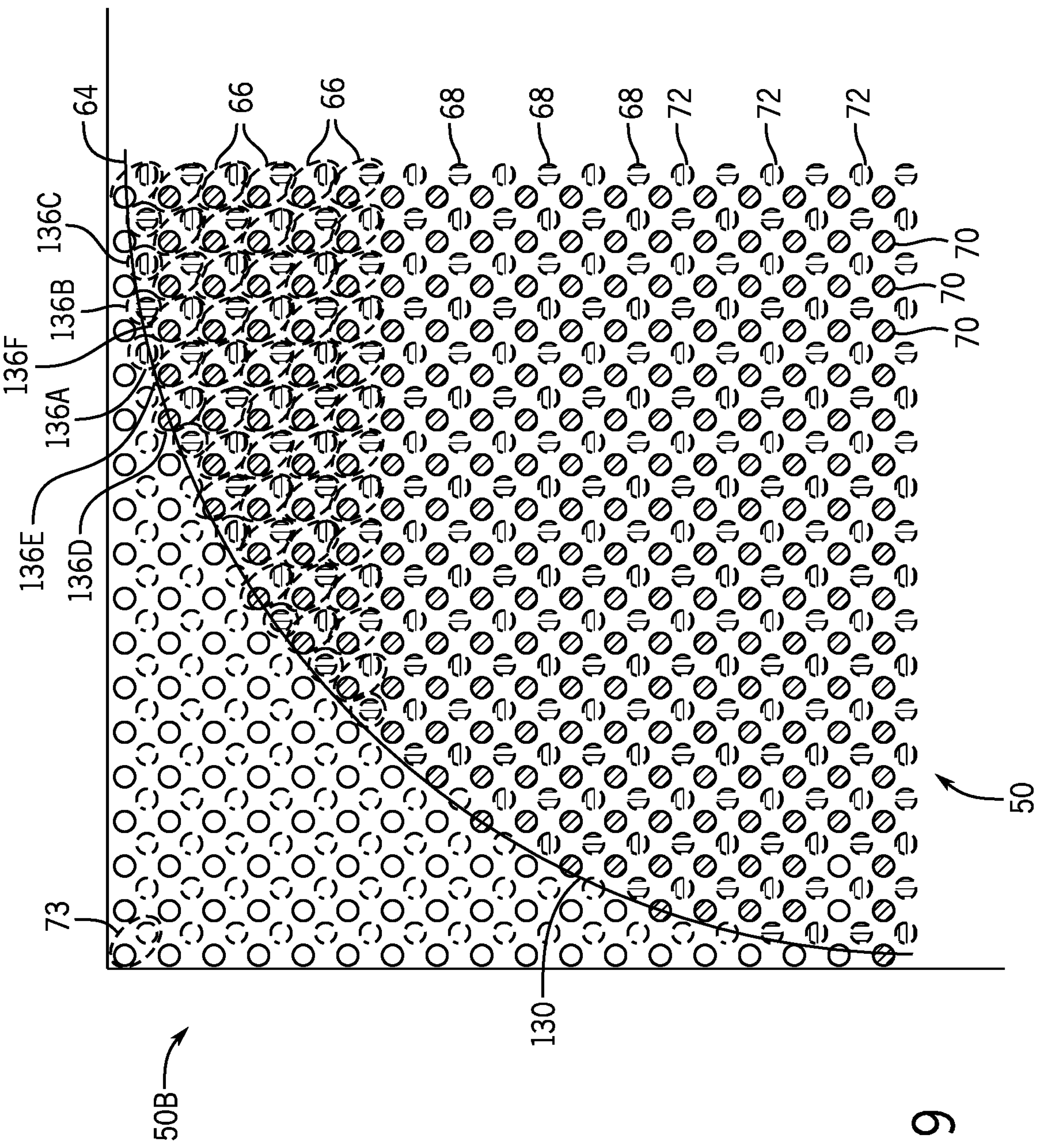
FIG. 9 is a diagrammatic representation of display pixels in a border of a display region, according to embodiments of the present disclosure.

FIG. 9 is a diagrammatic representation of display pixels 66 in a border of the second display region 50B, which may be located anywhere on the display 18 and change display region characteristics (e.g., dimensions) in different frames 55. As previously discussed, a border of a display region 50 may be rounded and the display 18 may include multiple display regions 50 that remain static or change between frames 55 of image data. The gain map techniques described herein with respect to the rounded border may apply to the display regions 50 that are static, dynamic, or both, between the frames 55. Moreover, it should be appreciated that the depicted display pixels 66 including sub-pixels are merely intended to be illustrative and not limiting. In other words, display pixels 66 in other electronic displays 18 may be implemented with varying sub-pixel layouts. Moreover, although the following description describes the second display region 50B, the techniques described herein may apply to any dynamic display region 50 (e.g., 50B-50D and so forth). In some embodiments, the techniques may be applied to a static display region 50, such as the first display region 50A previously discussed.

In the depicted embodiment, the display pixels 66 are organized in rows and columns. For example, a first display pixel row includes a first display pixel 66A, a second display pixel 66B, a third display pixel 66C, and so on. Additionally, a third display pixel row includes a fourth display pixel 66D, a fifth display pixel 66E, a sixth display pixel 66F, and so on. As described above, a display pixel 66 may include one or more sub-pixels, which each control luminance of a corresponding color component. In the depicted embodiment, the display pixels 66 include red sub-pixels 68, green sub-pixels 70, and blue sub-pixels 72. Additionally, in the particular depicted embodiment, display pixels 66 fully contained in the non-rectilinear display region each include two sub-pixels, for example, a green sub-pixel 70 and alternatingly a red sub-pixel 68 or a blue sub-pixel 72 (e.g., in a red, green, blue (RGB) display).

Some display pixels 66 along a rounded border 130 may include fewer sub-pixels in the non-rectilinear second display region 50B. In the depicted embodiment, such display pixels 66 may each include one sub-pixel, for example, alternatingly a red sub-pixel 68 or a blue sub-pixel 72. For example, due to a top-left rounded border of the display 18 of the second display region 50B, the first display pixel 66A may include only a blue sub-pixel 72, the second display pixel 66B may include only a red sub-pixel 68, and the third display pixel 66C may include only a blue sub-pixel 72, and so forth.

In any case, each display pixel 66 may correspond with a pixel position and, thus, an image pixel received from the image data source 38. With regard to the depicted embodiment, each display pixel 66 may correspond with an image pixel To display an image frame, luminance of each display pixel 66 may be controlled based at least in part on an image pixel image data corresponding with an image pixel at its pixel position. However, in some instances, shape of the image frame may differ from the shape of the display region 50 of the electronic display 18. For example, as previously mentioned, the image frame may be rectangular while the display region 50 for the image frame is non-rectilinear with rounded border. Moreover, the border gains may change with each frame 55 due to the dynamic nature of the second display region 50B. In such instances, one or more image pixels may correspond to pixel positions outside the display region 50 (e.g., along and/or outside the rounded border). For example, the first image pixel in the rectangular image frame may correspond to a pixel position 73, which is outside the non-rectilinear second display region 50. In other words, a display pixel 66 may not be implemented in the electronic display 18 at a pixel position corresponding with an image pixel.

Thus, to facilitate displaying an image frame on the second display region 50B with a different shape, the image frame could be adjusted before display, for example, by applying a black mask. However, as described above, display pixels 66 may rely on color blending to enable perception of a range of different colors. In other words, simply disregarding image pixels corresponding to pixel positions outside the display region may, in some instances, result in perceivable aliasing (e.g., a stair-step pattern) at a display pixel 66 along a rounded border 130 since neighboring display pixels 66 that the display pixel 66 would otherwise be blended with are not present. Moreover, perceivable color fringing may occur at a display pixel 66 along a straight border 64 since neighboring display pixels 66 that the display pixel 66 would otherwise be blended with are not present. To improve image quality, as described above, image pixel image data may be processed based on gain values associated with a corresponding pixel position.

The gain values may be provided by the primary gain map 52 and/or the secondary gain map 54 for static or dynamic display regions 50 in frames 55, respectively. Moreover, the primary gain map 52 and/or the secondary gain map 54 may be in an uncompressed format that explicitly associates (e.g., maps) each pixel position to a gain value set. Accordingly, one or more gain values associated with each pixel position and, thus, each sub-pixel position at the pixel positions, may be included in the uncompressed gain maps.

Figure 10:
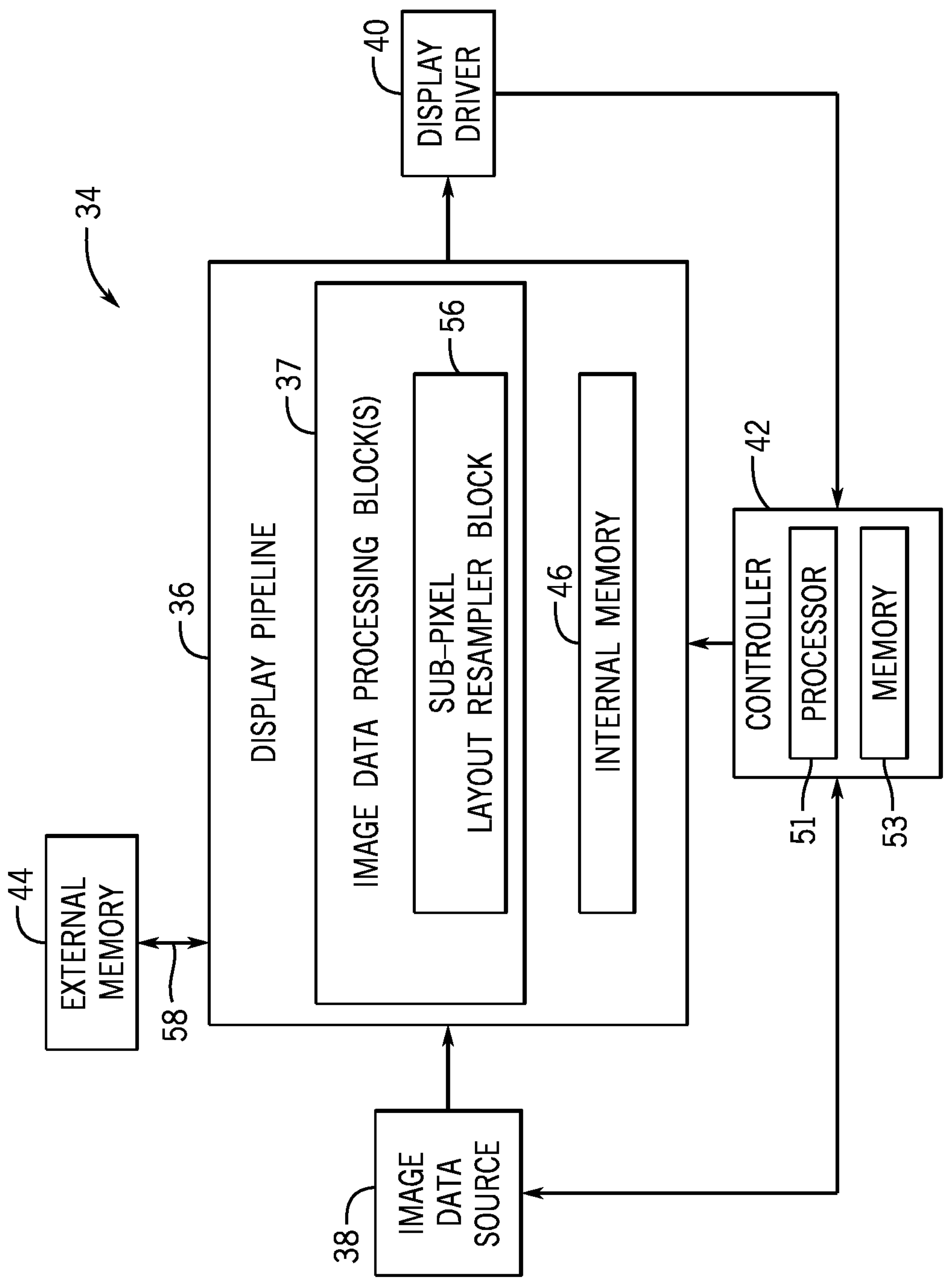
FIG. 10 is a block diagram of a display pipeline for processing and implementing the primary gain map and/or the secondary gain map, according to embodiments of the present disclosure.

FIG. 10 is a block diagram of a portion 34 of the electronic device 10 including a display pipeline 36 for processing the primary gain map 52 and/or the secondary gain map 54 to implement the gain values from the primary gain map 52 and/or the secondary gain map 54. In some embodiments, the display pipeline 36 may be implemented by circuitry in the electronic device 10, circuitry in the display 18, or both. For example, the display pipeline 36 may be included in a core complex of the processor(s) 12, image processing circuitry, a timing controller (TCON) in the display 18, and the like.

As depicted, the portion 34 of the electronic device 10 may also include an image data source 38, a display driver 40, a controller 42, and external memory 44. In some embodiments, the controller 42 may control operation of the display pipeline 36, the image data source 38, and/or the display driver 40. To facilitate controlling operation, the controller 42 may include a controller processor 51 and controller memory 53. In some embodiments, the controller processor 51 may execute instructions stored in the controller memory 53. Thus, in some embodiments, the controller processor 51 may be integrated with the processor(s) 12, the image processing circuitry, the timing controller in the display 18, and/or be a separate processing module. Additionally, in some embodiments, the controller memory 53 may be included in the local memory 14, the main memory storage 16, the external memory 44, an internal memory 46 of the display pipeline 36, and/or a separate tangible, non-transitory, computer readable medium.

In the depicted embodiment, the display pipeline 36 is communicatively coupled to the image data source 38. In this manner, the display pipeline 36 may receive image data of an image to be displayed on the display 18 from the image data source 38, for example, in a source (e.g., red, green, blue (RGB)) format and/or as a rectangular image. In some embodiments, the image data source 38 may be integrated with the processor(s) 12, the image processing circuitry, or both.

As described above, the display pipeline 36 may process the image data received from the image data source 38. To process the image data, the display pipeline 36 may include one or more applicable image data processing blocks 37. For example, in the depicted embodiment, the image data processing blocks 37 include a sub-pixel layout resampler (SPLR) block 56, which provides display pixel image data (e.g., image data in display format) by filtering (e.g., interpolating or sub-sampling) image pixel image data (e.g., image data in source format). In some embodiments, the image data processing blocks 37 may additionally or alternatively include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or the like.

As will be described in more detail below, the display pipeline 36 may process the image data received from the image data source 38 based at least in part on data stored in the external memory 44 and/or the internal memory 46. Mover, the display pipeline 36 may access the primary gain map 52 and/or the secondary gain map 54 stored in the external memory 44 and/or the internal memory 46. The primary gain map 52 and/or the secondary gain map 54 may be stored in compressed format (e.g., compressed version) within respective memories (e.g., random access memories (RAMs)). As will be discussed with respect to FIG. 12, a decompressor processing a decompression algorithm may decompress the compressed gain map to retrieve the gain values of the gain value sets applied to each pixel of the display regions 50.

Generally, storing data in the external memory 44 versus the internal memory 46, may present various implementation associated cost and/or processing efficiency tradeoffs. For example, due to physical sizing constraints, increasing storage capacity of the external memory 44 may be more cost-efficient than increasing storage capacity of the internal memory 46. As such, storage capacity of the external memory 44 may be larger than storage capacity of the internal memory 46.

Additionally, access to the external memory 44 and the internal memory 46 may differ. For example, the internal memory 46 may be dedicated for use by the display pipeline 36. In other words, data stored the internal memory 46 may be more readily accessible by the display pipeline 36, for example, with reduced latency, which may facilitate improving processing efficiency of the display pipeline 36. Comparatively, the display pipeline 36 may access the external memory 44 via a direct memory access (DMA) channel 58 since external memory 44 is external from the display pipeline 36. However, to provide data access in this manner, the direct memory access channel 58 may be implemented with increased bandwidth, which increases implementation-associated cost. Moreover, when the external memory 44 is shared with other components, data access latency and, thus, processing efficiency of the display pipeline 36 may be affected.

After processing, the display pipeline 36 may output processed image data, such as display pixel image data and/or the gain value sets, to the display driver 40 for implementation (e.g., driving the pixels with the image data and gain values). Based at least in part on the processed image data and the gain value sets from the gain maps, the display driver 40 may apply analog electrical signals to the display pixels of the electronic display 18 to display images in one or more image frames 55. In this manner, the display pipeline 36 may operate to facilitate providing visual representations of information on the electronic display 18 while also preventing or reducing image artifacts in various display regions.

Figure 11:
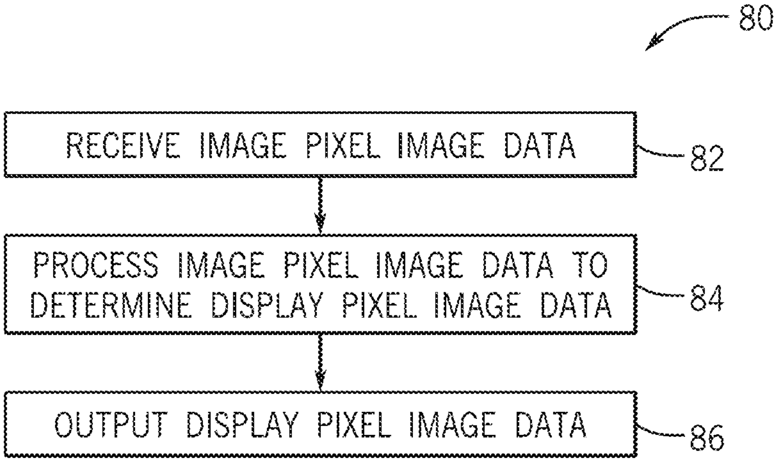
FIG. 11 is a flow diagram of a process for operating the display pipeline to apply the primary gain map and/or the secondary gain map, according to embodiments of the present disclosure.

FIG. 11 is a flow diagram of a process 80 for operating the display pipeline 36 to apply the primary gain map 52 and/or the secondary gain map 54. Any suitable device(s) (e.g., a controller) that may control the electronic device 10, components of the electronic device 10, or both, such as the processor(s) 12, the display pipeline 36, the display pipeline controller 51, and so forth, may perform the process 80. Similarly, any suitable device(s) that may control the electronic device 10 may perform process 100, as will be discussed with respect to FIG. 12, as well as process 150, as will be discussed with respect to FIG. 13. In some embodiments, the processes 80, 100, and 150 may be implemented by executing instructions stored in a tangible, non-transitory, computer-readable medium, such as the memory 14 or storage 16 of the electronic device 10, using the processor(s) 12. In additional or alternative embodiments, the processes 80, 100, and 150 may be performed at least in part by one or more software components, such as an operating system of the electronic device 10, one or more software applications of the electronic device 10, and the like. While the processes 80, 100, and 150 are described using the processor(s) 12, the present disclosure contemplates using any other suitable device, such as the display pipeline 36 or the device(s) mentioned above. Moreover, while the processes 80, 100, and 150 are described using steps in a specific sequence the present disclosure contemplates that the described steps may be performed in different sequences than the sequence illustrated, and certain described steps may be skipped or not performed altogether.

The process 80 includes the processor(s) 12 (e.g., or the display pipeline 36) receiving (process block 82) image pixel image data, for example, from the image data source 38 of FIG. 10. Specifically, the processor(s) 12 may receive image pixel image data, which indicates target luminance of color components at points (e.g., image pixels) in an image, from the image data source 38 pixel-by-pixel. In some embodiments, the image pixel image data may correspond to a rectangular image. Additionally, in some embodiments, the image pixel image data may be in a source format. For example, when the source format is an RGB format, the image pixel image data may indicate target luminance of a red component, target luminance of a blue component, and target luminance of a green component at a corresponding pixel position.

The processor(s) 12 may process (process block 84) the image pixel image data to determine display pixel image data, which is the image data to be displayed on the display 18 in one or more display regions 50 and may indicate target luminance of color components at display pixels of the electronic display 18. Specifically, to determine the display pixel image data, the processor(s) 12 may convert image data from a source format to a display format. In some embodiments, the processor(s) 12 may determine the display format based at least in part on layout of sub-pixels in the electronic display 18.

Moreover, processing the image pixel image data may include applying the gain of the value sets of the primary gain map 52 and/or the secondary gain map 54 at respective pixels corresponding to the image data, as will be discussed with respect to FIG. 13. As previously mentioned, the image pixel image data may be dynamic and borders of display regions may change with each frame 55, and as such, the secondary gain map 54 for each frame may also change correspondingly. After determining the display pixel image data, which includes applying the gain value sets to the pixels of the display regions 50, the processor(s) 12 may output (process block 86) the display pixel image data, for example, to the display driver 40 to drive the pixels accordingly.

Figure 12:
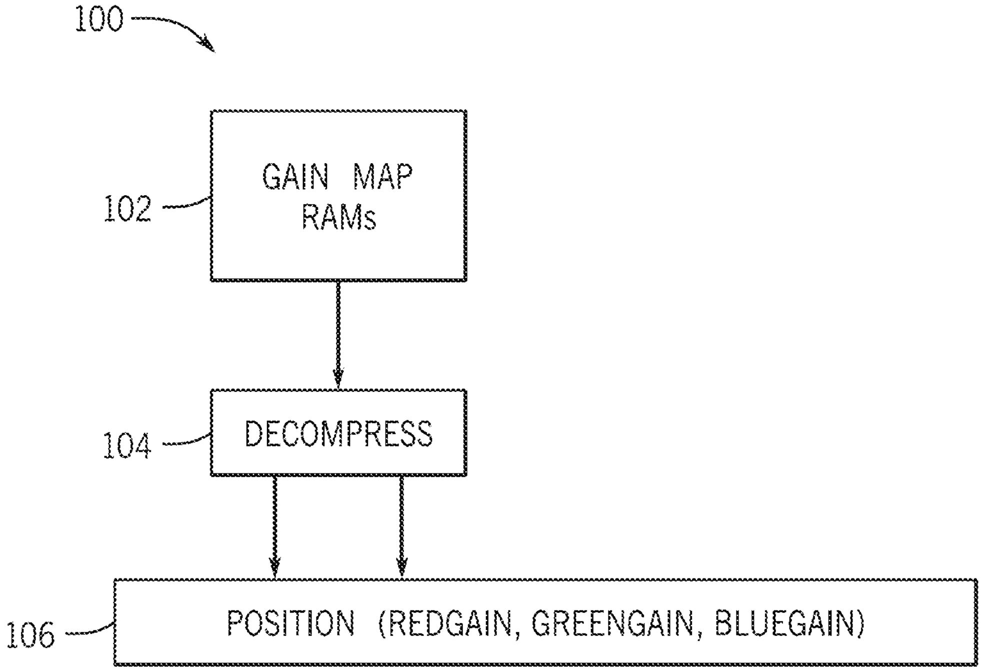
FIG. 12 is a flow diagram of a process for decompressing a compressed version of the primary gain map and/or the secondary gain map, according to embodiments of the present disclosure.

FIG. 12 is a flow diagram of a process 100 for decompressing a compressed version of the primary gain map 52 and/or the secondary gain map 54. Generally, the primary gain map 52 and/or the secondary gain map 54 are stored in a compressed format (e.g., compressed version) within respective memories, such as RAMs (block 102), as shown. In some cases, the gain maps may be stored separately and/or in dedicated RAMs. To take up less space, the primary gain map 52 and the secondary gain map 54 may be compressed into three segments including a run map, a position map, and a gain map. However, any other suitable form of compression may be used or compression may not be used altogether.

The primary gain map 52—corresponding to a static display region with borders that remain fixed—may be unchanged from frame to frame and the same gain value sets may be stored in the RAMs 102 for the primary gain map 52. By contrast, secondary gain map(s) 54—corresponding to one or more dynamic display region(s) with borders that may be changing—may change from frame to frame and different gain value sets may be stored in the RAMs 102 for the secondary gain map(s) 54 at different times. For example, the secondary gain map(s) 54 may change when certain animation is appearing from frame to frame. The secondary gain map 54 may be updated, for example, based on the image data (e.g., based on whether there is a border within the image data that is below or above a threshold value, such as gray level 0 (G0)), based on metadata associated with the image data, or by direct adjustment of the secondary gain map 54 in memory by image processing circuitry (e.g., GPU, display pipeline, an application processor). For instance, certain animation sequences may have a particular sequence of secondary gain map 54 gain value sets. Updates to the secondary gain map 54 gain value sets may change from frame to frame to correspond to changes in the image data being processed for display on the display 18. By way of example, the border of a dark region to enable an under-display sensor or a dialog box that appears onscreen may grow or shrink over the course of several frames. Yet both the static and changing borders may be crisp and precise using the primary gain map 52 and the secondary gain map(s) 54.

Although the borders of a dynamic display region 50 (e.g., 50B, 50C, or 50D of FIG. 7) may change from frame to frame, the borders of that dynamic display region 50 may also stay the same for some number of frames. However, the borders of the dynamic display regions 50 (e.g., 50B, 50C, or 50D of FIG. 7) are not consistently the same the way that the static display region 50A may be.

The gain maps (e.g., the primary gain map 52 and/or the secondary gain map 54) may be decompressed (block 104), as shown, to obtain the gain value sets from the gain maps. The gain maps may provide the gain for the particular pixel position at a sub-pixel of the pixel. The gain value set may include three gain values for sub-pixel positions (block 106), such as a red gain, a green gain, and a blue gain, for the red sub-pixel, the green sub-pixel, and the blue sub-pixel, respectively.

Generally, a run map may include the size of a current run of either coded rows or uncoded rows. A coded row may refer to a row of gains in a gain map that includes a gain for a red sub-pixel, a green sub-pixel, and a blue sub-pixel (redGain, greenGain, blueGain) triple (or a gain for a red sub-pixel, a green sub-pixel (redGain, greenGain) pair in the case of certain high-resolution and/or high dynamic range (HDR) panels with sub-sampled pixels). The gains may have any suitable bit depth. Using gains provided as values between 0 and 1 in 8-bit depth by way of example, coded rows may represent rows in which not all of the pixels are gained to 1. An uncoded row may refer to a row of a red sub-pixel, a green sub-pixel, and a blue sub-pixel (redGain, greenGain, blueGain) triples (or (redGain, greenGain) pairs in the case of certain high-resolution panels with sub-sampled pixels) having gain values that are all equal to 1. A certain gain triple may specify that the pixel corresponding to the gain shall not be modified. Other gain values may modify corresponding pixels. All three segments of compressed data (e.g., run map, position map, and gain map) may start at a byte boundary. That is, each segment may be byte aligned at the end of the segment. In one example, in the decompressed form, each gain map may provide the gain value sets. The map may provide three gains for each input pixel of the image impacted by the map that correspond to the red, green, and blue component respectively. The runs may alternate between coded and uncoded rows. The designation of whether the first row is coded is specified by the programmable bit start run register. Any suitable bit depth (e.g., 6 bits, 7 bits, 8 bits, 9 bits, 10 bits, 11 bits, 12 bits, 13 bits, 14 bits, 15 bits, 16 bits) may be used as gain values in the gain maps.

Additionally, programmable registers may specify an offset position and size of the area of pixels impacted by the primary gain map 52 and/or the secondary gain map 54, respectively. The offset position may be relative to the start of a display region 50 (e.g., in an active region) and the size of the area of pixels impacted by the gain map may include pixels disposed approximately entirely (e.g., completely) within that display region 50 or around that display region 50.

In addition to the gains derived from each stored compressed map, separate fixed gains along the rectilinear or straight edges of the display region 50 for the primary gain map 52 and/or the edges of the specified region for the dynamic, secondary gain map 54 may be specified through sets of registers, where the gains are independent per sub-pixel color (e.g., for red, green, and/or blue) and/or per edge of the display region 50. In the case of high-resolution panels with sub-sampled pixels, the pixels along the left and right edges will have either a red or a blue color component. Consequently, for these pixels, the other gain value may be disregarded. For each edge, a start and end pixel position may also be specified. These positions are relative to the start coordinate of an area that encompasses the display region 50 for the primary gain map 52 and the start coordinate of the specified region for the dynamic, secondary gain map 54, and may be included within the dimensions of the display region 50 for the primary gain map 52 and the region for the dynamic, secondary gain map 54, respectively. The edge gains, where specified or preset, may override the map gains or be applied in conjunction with the map gains. These settings may be preset by programming through a register.

The edge gains and decompressed map gains may be combined. In some embodiments, for any given pixel position, only one of the primary or dynamic, secondary gain maps may hold a gain value that is not equal to 1 with the exception that both maps may contain a gain value of 0. As such, a priority may be programmed to prioritize a gain from the primary gain map 52 or the dynamic secondary gain map 54. For example, the priority may be used when the decompressed map gain or its corresponding edge gain for any component is a non-zero gain in the gain map with selected priority. This may ensure that proper anti-aliasing is applied when the borders of a dynamic display region and the borders of a static region are near to one another or overlap (e.g., when a dynamic display region moves near or expands to reach the outer edge of the electronic display, such as a rounded edge of the electronic display).

Figure 13:
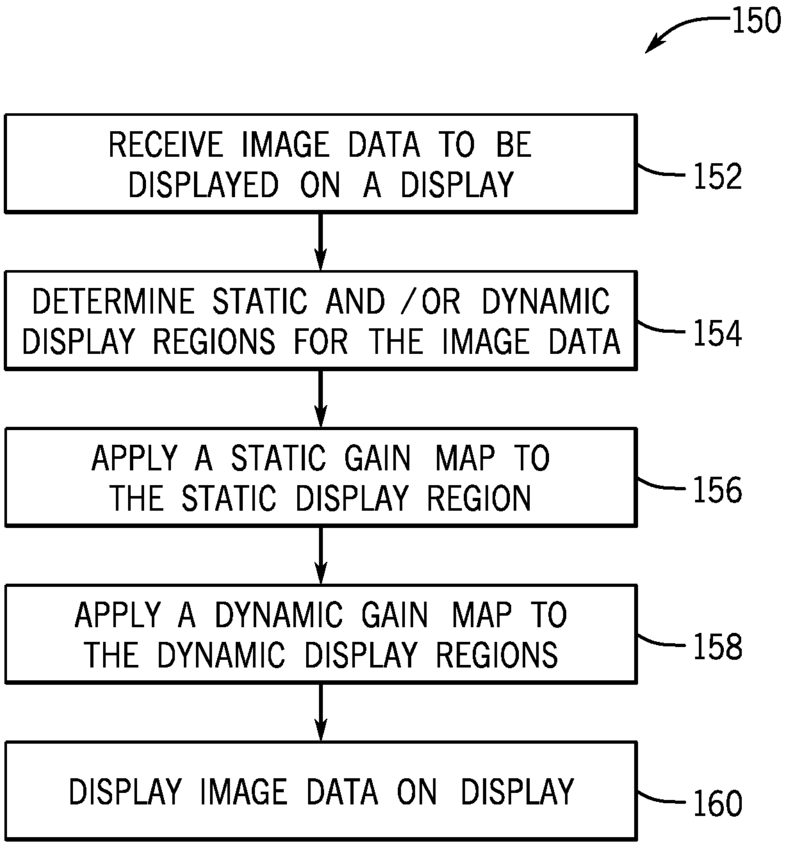
FIG. 13 is a flow diagram of a process for applying the primary gain map and/or the secondary gain map, according to embodiments of the present disclosure.

FIG. 13 is a flow diagram of a process 150 for applying the primary gain map 52 and/or the secondary gain map 54. In particular, the process 150 expands on the process 80 described with respect to FIG. 11. The process 150 includes processing circuitry (e.g., image processing circuitry such as the display pipeline 36, the processor(s) 12, a graphics processing unit (GPU)) receiving (process block 152) image data to be displayed on a display 18. For example, the image data may include the image pixel image data indicating target luminance at pixel positions for a frame, as discussed with respect to FIG. 11. The processing circuitry may determine (process block 154) dynamic borders associated with the image data. That is, the processing circuitry may determine whether a display region 50 is changing and is dynamic with respect to an initial frame 55 and/or subsequent frame 55 of image data. In some cases, the processing circuitry may analyze each of the frames 55 individually, as well as compare each frame 55 to a previous and/or subsequent frame 55 to determine changes in the frames 55, such as by target luminance at pixel positions in successive frames 55. Additionally or alternatively, secondary gain map 54 may be updated, for example, based on the image data (e.g., based on whether there is a border within the image data that is below or above a threshold value, such as gray level 0 (G0)), based on metadata associated with the image data, or by direct adjustment of the secondary gain map 54 in memory by image processing circuitry (e.g., GPU, display pipeline). For instance, certain animation sequences may have a particular sequence of secondary gain map 54 gain value sets for a particular display region 50. Updates to the secondary gain map 54 gain value sets may change from frame to frame to correspond to changes in the image data being processed for display on the display 18.

The processing circuitry may apply (process block 156) a static, primary gain map 52 to pixels in a static display region 50 (e.g., the static display region 50A). The processing circuitry may apply static gains to rounded borders for display regions that remain constant between frames 55. By way of example, such static display regions 50 may include rounded border edges of the display 18. The processing circuitry may also apply (process block 158) a dynamic, secondary gain map 54 to the dynamic display regions 50. Specifically, and as previously discussed, the processing circuitry may decompress stored compressed gain maps from RAMs, and then derive the gains at each pixel position for the rounded borders. The processing circuitry may store different sets of gain values into the secondary gain map(s) 54 for different image frames. As such, the secondary gain map(s) 54 may apply gains to changing borders in the dynamic display regions 50. While the flowchart of FIG. 13 illustrates block 156 and 158 as separate operations, the gain value sets of the primary gain map 52 and the gain value sets of the secondary gain map(s) 54 may be combined and applied to the image data in one operation.

The processing circuitry may display (process block 160) the image data on the display. By applying the appropriate gain values, the processing circuitry may remove or reduce any image artifacts or aliasing along the borders of the display regions 50 at each frame. In this manner, the display 18 may provide a seamless viewing experience using the gain map techniques described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:

a display panel configured to display a plurality of frames of image data having a static display region with a static border that remains the same across the plurality of frames of image data and having a dynamic display region with a dynamic border that changes between a first frame and a second frame of the plurality of frames of image data, wherein the dynamic display region overlaps the static display region; and processing circuitry configured to:

apply a first gain value set from a first gain map to a first portion of pixels of the first frame associated with the static border to reduce or eliminate aliasing image artifacts along the static border in the first frame;

apply a second gain value set from a second gain map to a second portion of pixels of the first frame associated with the dynamic border in the first frame to reduce or eliminate aliasing image artifacts along the dynamic border in the first frame;

apply the first gain value set from the first gain map to the first portion of pixels of the second frame associated with the static border to reduce or eliminate aliasing image artifacts along the static border in the second frame; and apply a third gain value set from a third gain map to a third portion of pixels of the second frame associated with the dynamic border in the second frame to reduce or eliminate aliasing image artifacts along the dynamic border in the second frame, wherein the third gain value set is different from the first gain value set and from the second gain value set.

2. The electronic device of claim 1, wherein the static border, the dynamic border, or both, comprise rounded borders.

3. The electronic device of claim 1, wherein the processing circuitry is configured to determine the static display region of the display panel comprising the static border.

4. The electronic device of claim 1, wherein the processing circuitry is configured to determine the dynamic display region of the display panel comprising the dynamic border.

5. The electronic device of claim 4, wherein the dynamic display region comprises dynamic characteristics between successive frames of the plurality of frames of image data.

6. The electronic device of claim 5, wherein the dynamic characteristics comprise a position of the dynamic display region, a position of the dynamic border within the dynamic display region, a dimension of the dynamic display region, a presence of the dynamic display region, or any combination thereof.

7. The electronic device of claim 4, wherein:
the processing circuitry is configured to determine the static display region of the display panel comprising the static border;
the static display region comprises a first portion of the display panel; and
the dynamic display region comprises a second portion of the display panel that is greater than the first portion of the display panel.

8. The electronic device of claim 1, wherein the second gain map and the third gain map are equal to or smaller than the first gain map.

9. The electronic device of claim 1, comprising:
a first area of dedicated memory storing a compressed version of the first gain map; and
a second area of dedicated memory storing a compressed version of the second gain map and of the third gain map.

10. The electronic device of claim 1, wherein the second gain map and the third gain map indicate an offset position of an area of the pixels associated with both the second gain map and the third gain map.

11. The electronic device of claim 1, wherein the second gain map and the third gain map indicate a size of an area of the pixels associated with the second gain map and the third gain map.

12. The electronic device of claim 11, wherein the processing circuitry is configured to determine the dynamic display region of the display panel comprising the dynamic border, and wherein the size of the area comprises pixels that are completely disposed within the dynamic display region.

13. The electronic device of claim 1, wherein the second gain value set from the second gain map and the third gain value set from the third gain map are dynamically configured, reconfigured, or both on a per-frame basis.

14. A method comprising:
receiving a plurality of frames of image data to be processed for display via pixels of a display panel, wherein the plurality of frames comprise a first frame and a second frame;
generating adjusted image data based on applying gains to the image data at least in part by:
determining a dynamic display region comprising a dynamic border that changes between the first frame and the second frame of the plurality of frames of image data;
accessing first gains of a first gain map associated with the first frame and second gains of a second gain map associated with the second frame, wherein the first gain map and the second gain map correspond to the dynamic display region of the display panel comprising the dynamic border that changes between the first frame and the second frame, and wherein the first gain map and the second gain map provide different gains between the first frame and the second frame of the plurality of frames of image data within the dynamic display region;
applying the first gains to a first portion of the image data of the first frame, wherein the first portion of the image data corresponds to a first subset associated with the pixels of the dynamic display region; and
applying the second gains to a second portion of the image data of the second frame, wherein the second portion of the image data corresponds to a second subset associated with the pixels of the dynamic display region; and
providing the plurality of frames of the adjusted image data for presentation on the display panel, wherein the dynamic display region overlaps a static display region while presented, and wherein the static display region comprises a static border that remains the same across the plurality of frames of image data.

15. The method of claim 14, wherein the dynamic display region changes in location, size, presence, or any combination thereof, between the plurality of frames of image data.

16. The method of claim 14, comprising:
determining a second dynamic display region separate from the dynamic display region, wherein the second dynamic display region comprises a second dynamic border that changes between the first frame and the second frame of the plurality of frames of image data;
accessing third gains of the first gain map associated with the first frame and fourth gains of the second gain map associated with the second frame, wherein the first gain map and the second gain map correspond to the second dynamic display region of the display panel comprising the second dynamic border that changes between the first frame and the second frame, and wherein the first gain map and the second gain map provide different gains between the first frame and the second frame of the plurality of frames of image data within the second dynamic display region;
applying the third gains to a third portion of the image data of the first frame, wherein the third portion of the image data corresponds to a third subset associated with the pixels within the dynamic display region; and
applying the fourth gains to a fourth portion of the image data of the second frame, wherein the fourth portion of the image data corresponds to a fourth subset associated with the pixels within the dynamic display region.

17. The method of claim 16, comprising:
determining the static display region that comprises the static border;
accessing fifth gains of a third gain map that provides the same gains between the first frame and the second frame of the plurality of frames of image data; and
applying the fifth gains to a fifth portion of the image data, wherein the fifth portion of the image data of the first frame corresponds to a fifth subset associated with the pixels within the static display region.

18. The method of claim 17, wherein the first gain map, the second gain map, the third gain map, or any combination thereof, are compressed and stored in one or more memories in compressed form, and wherein the method comprises decompressing the first gain map, the second gain map, the third gain map, or any combination thereof.

19. Image processing circuitry configured to:
receive a plurality of frames of image data to be processed for display via pixels of a display panel, wherein the plurality of frames comprise a first frame and a second frame;
generate adjusted image data based on applying gains to the image data at least in part by:
accessing first gains of a first gain map associated with the first frame and second gains of a second gain map associated with the second frame, wherein the first gain map and the second gain map correspond to a dynamic display region of the display panel comprising a dynamic border that changes between the first frame and the second frame, and wherein the first gain map and the second gain map provide different gains between the first frame and the second frame of the plurality of frames of image data;

18applying the first gains to a first portion of the image data of the first frame, wherein the first portion of the image data corresponds to a first subset associated with the pixels of the dynamic display region; and applying the second gains to a second portion of the image data of the second frame, wherein the second portion of the image data corresponds to a second subset associated with the pixels of the dynamic display region; and provide the plurality of frames of the adjusted image data for presentation, wherein the dynamic display region overlaps a static display region while presented, and wherein the static display region comprises a static border that remains the same across the plurality of frames of image data.

20. The image processing circuitry of claim 19, wherein the image processing circuitry is configured to:

access third gains of a third gain map, the third gain map providing the same gains between the first frame and the second frame of the plurality of frames of image data;

apply the third gains to a third portion of the image data of the first frame, wherein the third portion of the image data corresponds to a third subset associated with the pixels within the static display region; and provide the plurality of frames of the adjusted image data for presentation.

* * * * *